United States Patent [19]

Halstead

[11] 3,858,370
[45] Jan. 7, 1975

[54] RETAINER CLIP AND CLOSURE MEANS
[75] Inventor: Richard J. Halstead, Chesapeake, Va.
[73] Assignee: General Electric Co., Portsmouth, Va.
[22] Filed: Aug. 10, 1971
[21] Appl. No.: 170,560

[52] U.S. Cl. .................. 52/760, 24/73 B, 24/81 B, 403/405
[51] Int. Cl............................................. F16b 2/20
[58] Field of Search..... 24/73 B, 81 B, 73 SC, 84 B, 24/84 H; 52/562, 564, 714, 760; 287/189.35; 403/405

[56] References Cited
UNITED STATES PATENTS

| | | | |
|---|---|---|---|
| 2,317,428 | 4/1943 | Anderson................... | 52/714 X |
| 2,459,953 | 1/1949 | Mills........................... | 287/189.35 |
| 2,651,483 | 9/1953 | Ritchie et al.............. | 24/84 B X |
| 2,921,464 | 1/1960 | Olsen.......................... | 52/760 X |
| 3,279,729 | 10/1966 | Buttriss...................... | 24/73 B X |

FOREIGN PATENTS OR APPLICATIONS

| | | | |
|---|---|---|---|
| 245,740 | 8/1963 | Australia................. | 24/84 B |
| 1,384,230 | 11/1964 | France..................... | 52/760 |
| 124,540 | 1/1946 | Australia................. | 24/73 B |
| 252,143 | 2/1963 | Australia................. | 24/73 B |
| 86,736 | 2/1966 | France..................... | 24/73 B |
| 840,329 | 7/1960 | Great Britain.......... | 24/73 B |
| 867,420 | 5/1961 | Great Britain.......... | 24/73 B |
| 611,817 | 10/1960 | Italy....................... | 24/73 B |

Primary Examiner—Paul R. Gilliam
Assistant Examiner—David H. Corbin

[57] ABSTRACT

An elongate retainer clip having securing means at one end comprising teeth and associated means for causing the teeth to biasedly engage a stationary member to which the clip is attached. Abutment means are formed for limiting the depth to which the securing means engage the stationary member, and to provide a surface upon which pressure may be applied to facilitate initial engagement. The opposite end of the clip is provided with an inclined extremity and a latching projection such that the latching projection may be released by applying pressure to the inclined surface. In a further embodiment, the retainer clip is used to secure a panel to an enclosure having an extended flange thereabout. In order to disengage the clip the panel is rotated, pivoting upon the edge of the flange and deflecting the edge of the clip downwardly.

3 Claims, 6 Drawing Figures 3,858,370

RETAINER CLIP AND CLOSURE MEANS

BACKGROUND OF THE INVENTION

The present invention relates generally to fastening means and, more particularly, to a resilient retaining clip for releasably connecting a pair of juxtaposed elements comprising an appliance closure or a cabinet.

In constructing cabinets for devices such as television receivers, it is necessary to provide means for releasably attaching a chassis or a panel to the cabinet. The attaching means should be capable of holding the member in place despite impact, cabinet distortion, and stresses which tend to pull the panel loose. Often, the member is secured by means of bolts or screws; however, in addition to requiring extra effort to unfasten them during servicing such screws require mating threaded apertures within the cabinet and, moreover, are easily lost once removed.

Various types of clips have been devised for securing panels and chassis within television cabinets. Many of these, however, require separate means to secure one end of the clip to the cabinet or closure, thus increasing the expense and effort required to install the clips.

Many types of retainer clips have been used in other environments for securing juxtaposed elements together. In U.S. Pat. No. 2,571,276 — Koch, issued Oct. 16, 1951, there is shown one such arrangement in which such a spring clip is secured to a stationary member by means of cross pieces and spot welding, and serves to releasably attach a grille to the stationary member. Such a clip, however, is not adapted for use with a wood or plastic appliance cabinet since it requires spot welding for attachment.

In U.S. Pat. No. 3,429,603 — Gejoff, issued Feb. 25, 1961, there is shown a spring clip for assembling together a two-part housing. One end of the clip is bent upwardly and has a T-shaped configuration, an adjacent portion being provided with a plurality of pointed teeth. This type of clip, however, requires a T-slot of the proper dimensions, and does not allow any appreciable lateral tolerance in the positioning of the clip. Further, the end portion must necessarily protrude outside the confines of the slot.

It will thus be seen that there is a need for a retainer clip which may easily be attached to wood or plastic cabinets without need of additional fastening means. It is desirable that such a retainer clip be readily locatable at a desired position yet be resistant to loosening or withdrawal.

It is therefore an object of the present invention to provide improved, readily located fastening means for releasably connecting a pair of juxtaposed elements.

It is a further object of the present invention to provide an improved retainer clip which may be located in an elongated, closed slot.

It is still another object of this invention to provide a closure assembly including a retaining device which may be released by proper manipulation of the closure elements.

SUMMARY OF THE INVENTION

Briefly stated, in accordance with one aspect of the invention the foregoing objects are achieved by providing an elongate fastening device comprising a retainer clip having latching means at one end for engaging a removable member, and securing means at the opposite end for firmly attaching the clip to a stationary member. In a first embodiment, a fulcrum tab and a plurality of engaging teeth protrude from one side of the securing end of the clip. Abutment means protrude from the opposite side, disposed inwardly of the teeth. Upon insertion into a slot, the fulcrum tab and teeth engage one side of the slot, the abutment providing a ready means for applying insertion pressure, and limiting the depth of insertion into the slot.

In the second embodiment, the securing end of the clip is bent into an S-shape and engaging teeth struck from two confronting surfaces of the S. The clip is then forced over the edge of a generally planar portion of the stationary means such that the teeth engage either side of the member and prevent the withdrawal of the clip.

In a further embodiment of the present invention the inventive retainer clip is provided in combination with a first, stationary housing having a flange extending beyond a support which is engaged by the securing end of the clip. The edge of a removal panel is adapted to slip between the flange and the clip, engaging the latching means of the clip. The panel is disengaged by simply rotating it against the edge of the flange.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiments taken in conjunction with the accompanying drawings in which:

DESCRIPTION OF THE PREFERRED EMBODIMENTS

Figure 1:
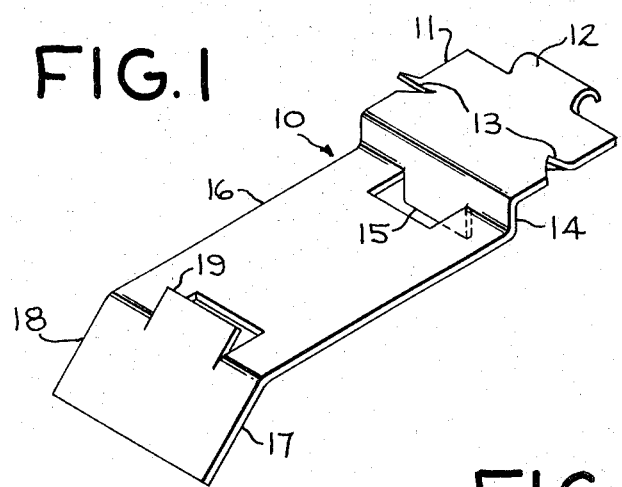
FIG. 1 is a perspective view of one embodiment of the inventive retainer clip.

FIG. 1 shows a preferred embodiment of the fastening device or clip of the present invention. The clip, generally indicated at 10, is provided with a first end 11 which is adapted to engage the inner surfaces of a slot. Fulcrum tab 12 is formed at the outer edge of the clip end and extends generally perpendicularly to the clip surface. It will be seen that the end of tab 12 is rounded or curved to preclude the existence of a sharp edge which might engage an adjacent surface. Inwardly of tab 12 are provided a pair of securing teeth 13 which may advantageously be struck from the material of the clip. In contradistinction to tab 12, teeth 13 have pointed extremities for engaging an adjacent surface.

Further inwardly of first end 11 the body of the clip is bent into a Z configuration, as shown at 14. The intermediate portion of the Z bend serves as an abutment to prevent the first end 11 of the clip from being inserted too far in a receiving slot. Tab 15 is struck from the midsection of the clip and, in addition to extending the effective height of the abutment formed at 14, provides an additional surface to which pressure may be applied when installing the first end 11 of the clip in a suitable portion of a slot. An elongate intermediate section 16 spaces the second end 17 of the clip from the first end 11 and provides sufficient flexion to allow the disengagement of the clip.

Detent means such as a projection 19 is struck from the material of the clip for engaging a member to be secured (not shown). The terminal portion 18 of second end 17 is inclined from the plane of intermediate section 16 to allow the clip to be grasped easily, and to provide a ramp-like surface which cams the clip downwardly when it meets the leading edge of the member to be secured.

Figure 2:
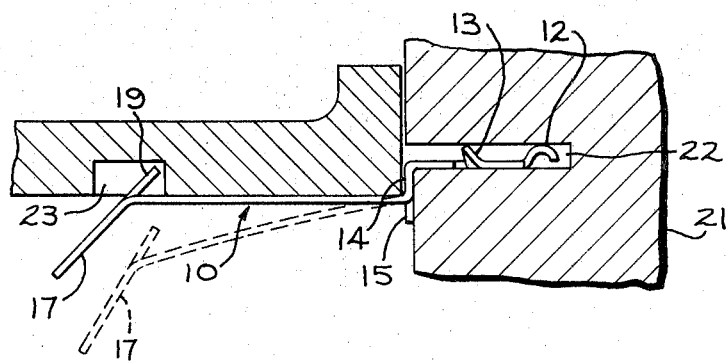
FIG. 2 shows the clip of FIG. 1 securing a pair of juxtaposed elements together.

Turning now to FIG. 2, there is shown a fastening device of the type disclosed in FIG. 1, in combination with a pair of juxtaposed elements 20 and 21 which are to be secured together. It will be seen that first end 11 of the clip has been inserted into a slot 22. The rounded bottom of fulcrum tab 12 bears against the upper side of the slot, and prevents end 11 from tilting. The planar surface of end 11 is thus brought into close contact with the lower side of the slot, forcing the teeth 13 to resiliently engage the upper side of the slot. Due to the direction in which teeth 13 are struck from the body of the clip, they tend to be deflected slightly upon insertion of end 11 into slot 22, but are urged upwardly to bite into the upper side of the slot should an attempt be made to withdraw the clip. The bent section 14 of the clip abuts upon the portion of first member 21 adjacent the slot, limiting the insertion of end 11. At the opposite end 17 of the clip, projection 19 is received in a cooperating depression 23 to prevent the separation of elements 20 and 21.

When it is desired to separate elements 20 and 21, the second end 17 of the clip is deflected to the position generally indicated by the dotted lines. Projection 19 is withdrawn from engagement with the depression 23, and element 20 may be removed.

It will be seen that abutment 14 and fulcrum tab 15 cooperate to resist stresses due to the flexion of intermediate section 16, and hold the second end 11 of clip 10 firmly in place during disengagement of the clip from element 20. Repeated deflection of the distal end 17 of the clip thus will not cause securing teeth 13 to work loose in the slot.

Figure 3:
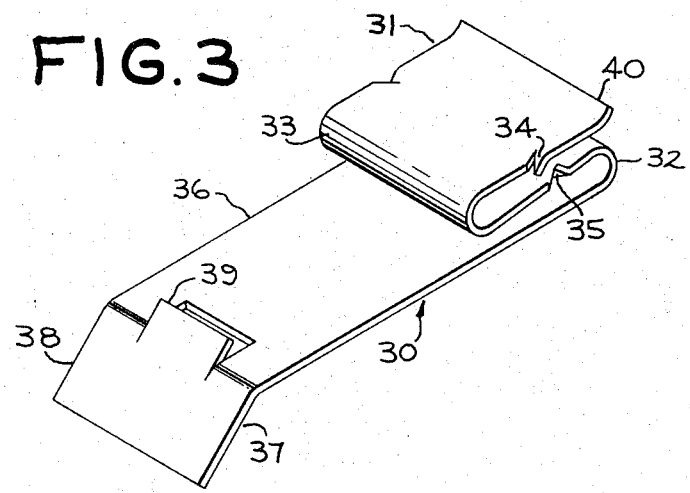
FIG. 3 shows a second embodiment of the inventive retainer clip.

FIG. 3 shows a second embodiment of the invention retainer clip. This clip, generally indicated at 30, has an end 37 similar to second end 17 of the embodiment of FIG. 1. An inclined extremity 38 is provided to facilitate the deflection of the clip. Detent means 39 are provided, and may advantageously comprise a tab struck from the body of the clip at the initial portion of inclined extremity 38.

The opposite end of retainer clip 30 is bent backwardly at 32, and then forwardly at 33 so that the end of the clip assumes a configuration which will generally be referred to as an S-shape. The portion of the S-shape opening toward the end of the clip may advantageously be provided with an upwardly directed edge 40 for facilitating the insertion of a planar support therein. Teeth 34, 35 are struck from upper and lower confronting surfaces of the S-bend, respectively. The teeth are formed in a manner to receive the planar support, but engage the surface thereof to resist withdrawal. The terminal end 33 of the opening of the S-bend serves both to limit the depth of insertion of the planar support, and to provide an abutment against which force may be applied for forcing the toothed surfaces over the planar support.

Figure 4:
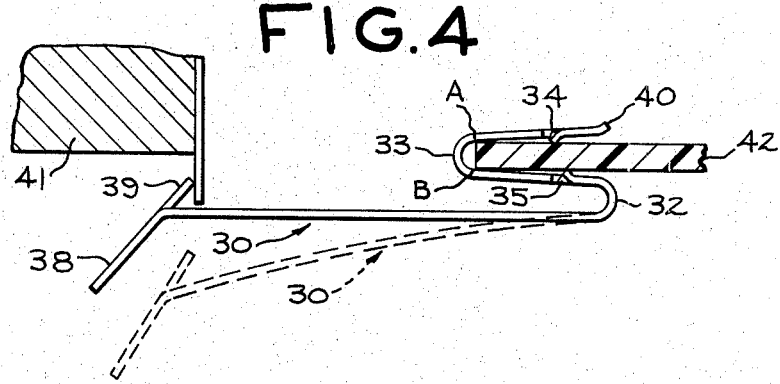
FIG. 4 shows the clip of FIG. 3 securing a pair of elements together.

FIG. 4 shows the retainer clip of FIG. 3 installed over a planar support 42. It will be seen that teeth 34, 35 engage the upper and lower surfaces, respectively, of support 42 and tend to biasedly force apart the uppermost and intermediate portions of the first, S-shaped end of the clip. The distal ends of the teeth engage the surface of support 42 in such a manner as to resist withdrawal of the clip. By applying pressure against upper bend 33 the clip may be forced over support 42, until the edge of the support surface abuts the inner surface of bend 33.

A retained element 41 is shown after having engaged detent means 39 of the second end of the retaining clip. To engage the clip, element 41 need only be brought into contact with inclined end 38, forcing the end of the spring clip downwardly and riding over detent means 39. Once engaged by the detent means, retained element 41 is maintained in position by the spring clip and cannot be withdrawn until the clip is deflected downwardly, as shown by the dotted lines.

Upon deflection of the clip, teeth 35 are forced into still tighter engagement with support 42, due to the novel configuration of the first end of the spring clip. As end 37 of clip is displaced downwardly, the entire clip tends to rotate about the upper edge of support 42, herein denominated point A. The counter-clockwise stress thus effected forces teeth 35 upwardly against the lower surface of mount 42, further resisting withdrawal or dislodgment of the secured end of the clip. Depending on the configuration of bend 33 and the relative dimensions of bend 33 and support 42 the clip may alternatively tend to rotate about the lower edge of the support, herein indicated as point B. In either event, the counter-clockwise rotational bias forces lower teeth 35 into tighter engagement with the lower surface of planar support 42 to increase their resistance to dislodgment.

Figure 5:
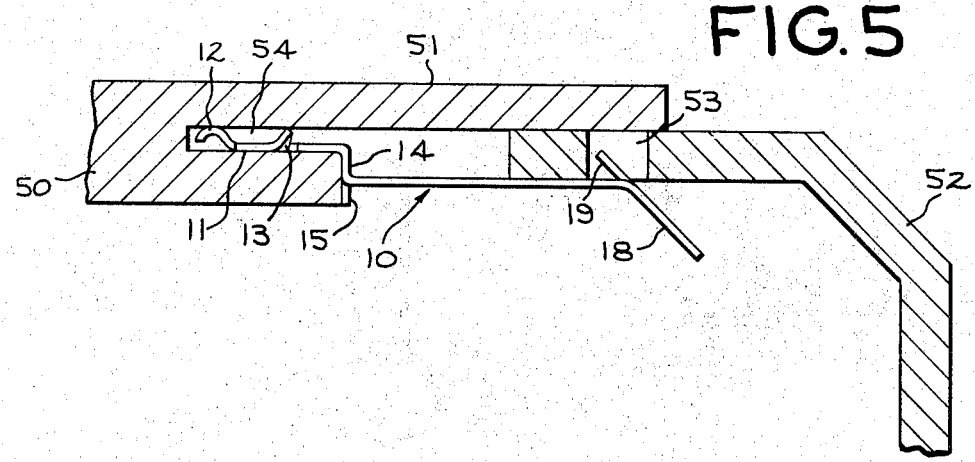
FIG. 5 illustrates the use of the inventive clip in conjunction with a pair of cooperating closure members to allow disengagement upon manipulation of one of the members.

Turning now to FIG. 5, there is shown a further embodiment of the invention which incorporates a clip of the type disclosed above. Either of the retainer clips depicted in FIGS. 1 or 3 may be utilized; for ease in illustration, the clip illustrated in FIG. 1 is shown. First end 11 of the clip 10 is received in a slot 54 of an enclosure such as a television receiver cabinet, a portion of which is shown at 50. A flange 51 is formed by an extension of the upper edge of the slot. A panel 52 having latching means such as an aperture or a depression 53 therein is slidingly disposed between clip 10 and flange 50. The inner edge of panel 52 initially engages the inclined end 18 and projection 19 of the clip, camming the clip downwardly to allow passage of the inner edge of panel 52. As depression 53 becomes aligned with projection 19 the spring action of the clip snaps projection 19 into the depression, preventing the withdrawal of the edge of panel 52.

Figure 5A:
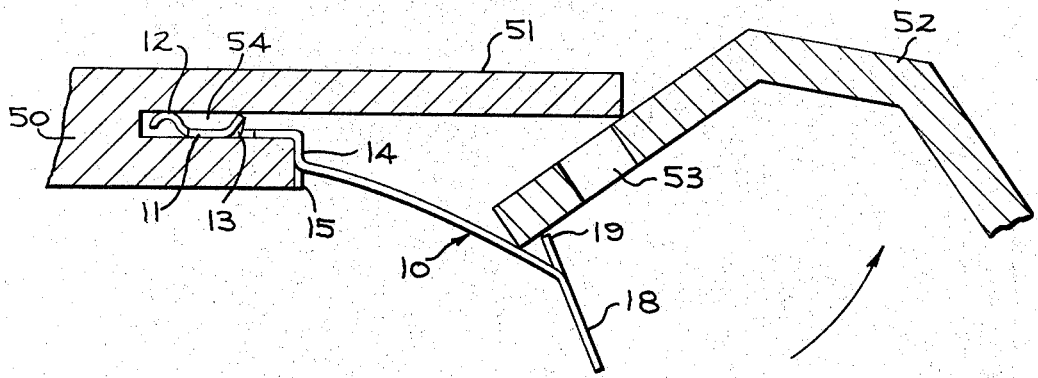
FIG. 5a shows the embodiment of FIG. 5 with one member raised to disengage the clip.

It is contemplated that flange 51 may extend about the periphery of the panel 52, precluding access to retainer clips 10. The edge of the panel, however, extends within flange 50 a predetermined distance beyond depression 53 so that upon lifting panel 52 in the manner indicated by the arrow in FIG. 5a the upper surface of the panel pivots against the lower edge of flange 51. The inner edge of panel 52 then forces retainer clip 10 downwardly in the manner shown, disengaging projection 19 from opening 53. Panel 52 may now be lifted free of the enclosure. The panel may easily be replaced by merely sliding the edge thereof between retainer clip 10 and flange 51, as described above.

As was the case with the embodiment shown in FIG. 2, abutment 14 and fulcrum tab 12 cooperate to retain the secured end of retainer clip 10 immovably in slot 54. No motion is then imparted to teeth 13 as clip 10 is deflected, and the retainer clip is prevented from working loose despite repeated installation and removal of panel 52. Alternatively, it will be understood that clip 30 might be utilized, the lower planar element constituting the area below slot 54 being received by the opening formed by the S-shaped, securing end of clip 30. In any case, the cooperation of the retainer clip and closure elements 50 and 52 would be identical.

It will now be seen that the present invention includes an improved fastening means which may be easily secured to a support or housing without the need for special tools or additional fastening devices, and which facilitates the ready disengagement of juxtaposed elements. As will be evident from the foregoing description, certain aspects of the invention are not limited to the particular details of construction of the examples illustrated, and it is therefore contemplated that other modifications or applications will occur to those skilled in the art. It is accordingly intended that the appended claims shall encompass all such modifications and applications as do not depart from the true spirit and scope of the invention.

What is claimed as new and desired to be secured by Letters Patent of the United States is:

1. Fastening means for releasably coupling first and second planar members in substantially parallel planes, said fastening means including:
   a first end of a generally S-shaped configuration comprising first, second and third substantially parallel, spaced portions, said first and second portions defining a first channel opening in a first planar direction and said second and third portions defining a second channel opening in an opposite planar direction, said first channel including at least two upstanding teeth extending from lower and upper confronting surfaces of said first and second portions respectively for engaging said first planar member upon insertion thereof into said first channel;
   a second end comprising an extension of said third portion and being disposed in a plane substantially parallel to said first channel, said second end extending substantially beyond said first end and including detent means extending upwardly from a surface thereof and being inclined toward said first end for engaging said second member to prevent axial separation from said first member and further including a ramp-like surface extending oppositely from said second end to facilitate the engagement of said detent means with said second member.

2. The invention as defined in claim 1 wherein said detent means is disposed upon the same side of said fastening means as said first portion of said S-shape.

3. The invention as defined in claim 2 wherein each said tooth contacting one surface of the planar portion of the first member is disposed substantially opposite to a corresponding said tooth contacting the opposite surface of the planar portion of the first member.

* * * * *